INVENTOR.
VAN C. MARTIN

July 6, 1965

V. C. MARTIN 3,192,854

PRINTER CONTROL SYSTEM

Filed March 27, 1963

V. C. MARTIN 3,192,854

PRINTER CONTROL SYSTEM

Filed March 27, 1963

V. C. MARTIN 3,192,854

PRINTER CONTROL SYSTEM

Filed March 27, 1963

July 6, 1965  V. C. MARTIN  3,192,854
PRINTER CONTROL SYSTEM
Filed March 27, 1963  6 Sheets-Sheet 5

FIG. 13

United States Patent Office 3,192,854
Patented July 6, 1965

3,192,854
PRINTER CONTROL SYSTEM
Van C. Martin, Endicott, N.Y., assignor to International Business Machines Corporation, New York, N.Y., a corporation of New York
Filed Mar. 27, 1963, Ser. No. 268,365
4 Claims. (Cl. 101—93)

The present invention relates to printing and has reference in particular to a system of controls for a printer such as a helix and bar type printer.

Generally stated, it is an object of the present invention to provide an improved print control system for a helix and bar type printer.

More specifically, it is an object of the present invention to provide in a helix and bar printer for storing a representation of each of a plurality of characters to be printed in a dot matrix pattern at different print positions, and for serially scanning the dot positions of the matrix character by character to determine what dot positions are to be printed at each print position.

Another object of the invention is to provide for generating dot timing pulses each time one of a plurality of helices in a helix and bar printer passes a dot position, and using these pulses to initiate serially addressing character storage for activating select ones of a plurality of addressable print bars located in different print positions.

Yet another object of the invention is to provide in a helix and bar printer for forming printed characters by printing a plurality of dots in different predetermined ones of a plurality of dot positions in a dot matrix, and for addressing the storage positions of a character storage buffer serially in turn for each possible dot position for the particular character.

It is also another object of the invention to provide in a helix and bar printer for producing a dot time generator pulses each time any one of a plurality of helices passes a given dot position and for using the output to drive a ring counting the pulses as well as starting a clock to serially address a plurality of character storage positions each dot time.

Still another object of the invention is to provide in a helix and bar printer for storing representations of a plurality of characters to be printed at particular print positions in a line by means of a plurality of dots in a dot matrix, generating dot timing pulses in timed relation to the passage of the helix by each of a plurality of character designating dot positions, and addressing stored character representations serially at each dot time to determine for each character in turn whether it requires the particular dot in its representation.

It is an important object of this invention to provide in a helix and bar printer for storing coded representations of a plurality of characters to be printed at different print positions in a line by means of different dot positions in a dot matrix, producing dot timing pulses in timed relation to the movement of the helix and paper past each print position, and addressing the stored representations serially at each dot time to determine what dots are required at each print position.

Another important object of the invention is to provide for storing at different addresses coded representations in accordance with one code of a plurality of characters to be printed by dots at different positions in a dot matrix by means of a rotating helix and a plurality of print bars generating trains of dot timing pulses in timed relation with movement of the helix and paper, serially addressing every storage position at each dot time, converting the coded character representations to a dot matrix representation each time a storage position is addressed, and printing a dot in such print positions as are called for by the dot matrix representation of each character.

In a preferred embodiment of the invention, a helix and bar print mechanism comprises a plurality of helices arranged on a continuously rotating cylinder so as to provide one portion of a helix at each of a plurality of print positions along a print line. A record medium such as a continuous paper form passes over the rotating helices at a constant rate along with the usual carbon paper or the like. Printing is accomplished by a row of print bars, one for each print position, which are arranged for longitudinal movement toward and away from the helices to drive the paper and the carbon paper thereagainst. The bars are operated toward the helices by individual electrostatic clutches which are energized in the proper timed relation.

Signals for operating the print bars are generated by a ring driven by dot timing emitter means operated in synchronism with the helices. Characters to be printed are stored in a multiplane print buffer core storage matrix in a binary coded decimal code. The buffer storage is addressed serially by units and tens rings, and character representations are read into and out of storage serially by character and parallel by bit, from and to a single character register. A decode matrix translates the binary coded decimal character representation into a dot matrix position representation for each character as it is read into the register from storage.

At each dot time the buffer storage is scanned serially, and the representation in the decode matrix of each character is examined in turn for a dot 1, then again for a dot 2, and so on through dot 35. Each time a dot is called for in a character, a print bar is activated to print the dot. The dot generator provides a 38 dot count to permit spacing between the lines of characters. The dot generator is then reset and the procedure is repeated for the next line.

The foregoing and other objects, features and advantages of the invention will be apparent from the following more particular description of preferred embodiments of the invention, as illustrated in the accompanying drawings.

In the drawings:

FIG. 13 is a chart showing the relationship of the binary coded decimal character code to the dot matrix code as produced by the translator which determines the number and position of dots required to form each character.

Figure 1:
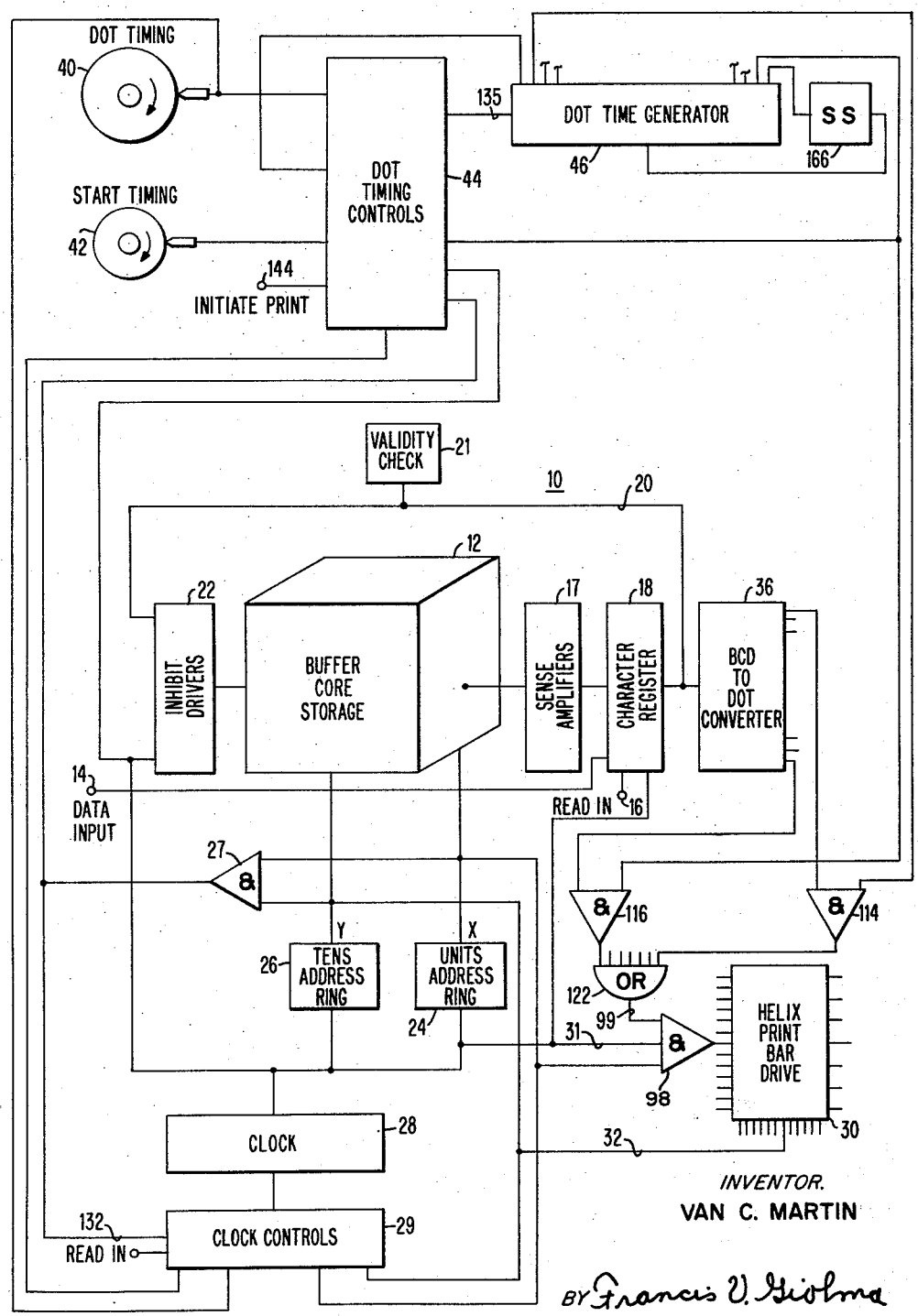
FIG. 1 is a schematic diagram in block form of a control system for a helix and bar type printer.

In each of the drawings of the various control circuits, the individual components or units making up the circuit are generally indicated merely as a box or the like. The specific circuitry of such boxes will not be generally described as applied to any specific form of tube, diode circuit, semiconductor circuit or the like. A detailed description of typical diode coincidence switches, diode mixers, inverters, single and double latches along with cathode followers, power tubes and the like, such as may be used, is shown and described in the application of F. E Hamilton et al. which issued as Patent No. 2,959,351 on November 8, 1960.

For the purpose of this description, a typical coincidence switch shown as a triangle and otherwise known as a logical AND circuit or diode switch, comprises usually diodes or the like, not shown, each including an individual input terminal which may be normally biased negative so that the common terminal is at a negative potential with respect to ground. If coincident positive pulses are applied to all input terminals, the potential of the output terminal is raised; however, if only one of the input terminals or less than all of the input terminals is pulsed positively, the potential of the common output terminal is not raised appreciably. Any suitable voltage responsive device may be controlled by the potential of the output terminal to furnish a usable output voltage level whenever a coincidence of input pulses is detected.

A typical mixer or mix, otherwise known as a logical OR circuit or diode mix may also comprise diodes, tubes, semiconductor devices or the like. In the present drawings to distinguish diode mixes from diode switches, the former are shown as a semicircle. Any suitable voltage responsive device may be controlled by the potential of the common output terminal of the diode mix. This terminal is connected by a suitable resistor to a negative voltage source (not shown) and maintains a negative bias on the related diode or tube. Each diode is connected to an individual input terminal which in turn is connected in the electrical circuit. If either or all or any of the input terminals are raised, the potential of the output terminal is raised, which permits the tube, diode or the like associated therewith to conduct or operate in a predetermined manner.

In the drawings all amplifiers, inverters, double inverters and the like which would normally be required to maintain the proper signal levels have for the purposes of simplicity been shown only in block form or eliminated. Also for the sake of simplicity, details of the necessary well-known types of driving rings and latches have been eliminated, since these are well known in the art. Generally, a single latch comprises a double inverter and a cathode follower which responds when input signals raise the output of a cathode follower, which in turn supplies the desired signal and has a feedback leading into the input to maintain the cathode follower conducting. A more detailed explanation is provided in the above Hamilton et al. patent and apparatus of this type is also shown and claimed in the patent to E. S. Hughes, Jr., Patent No. 2,628,309 which issued on February 10, 1953.

Figure 13:
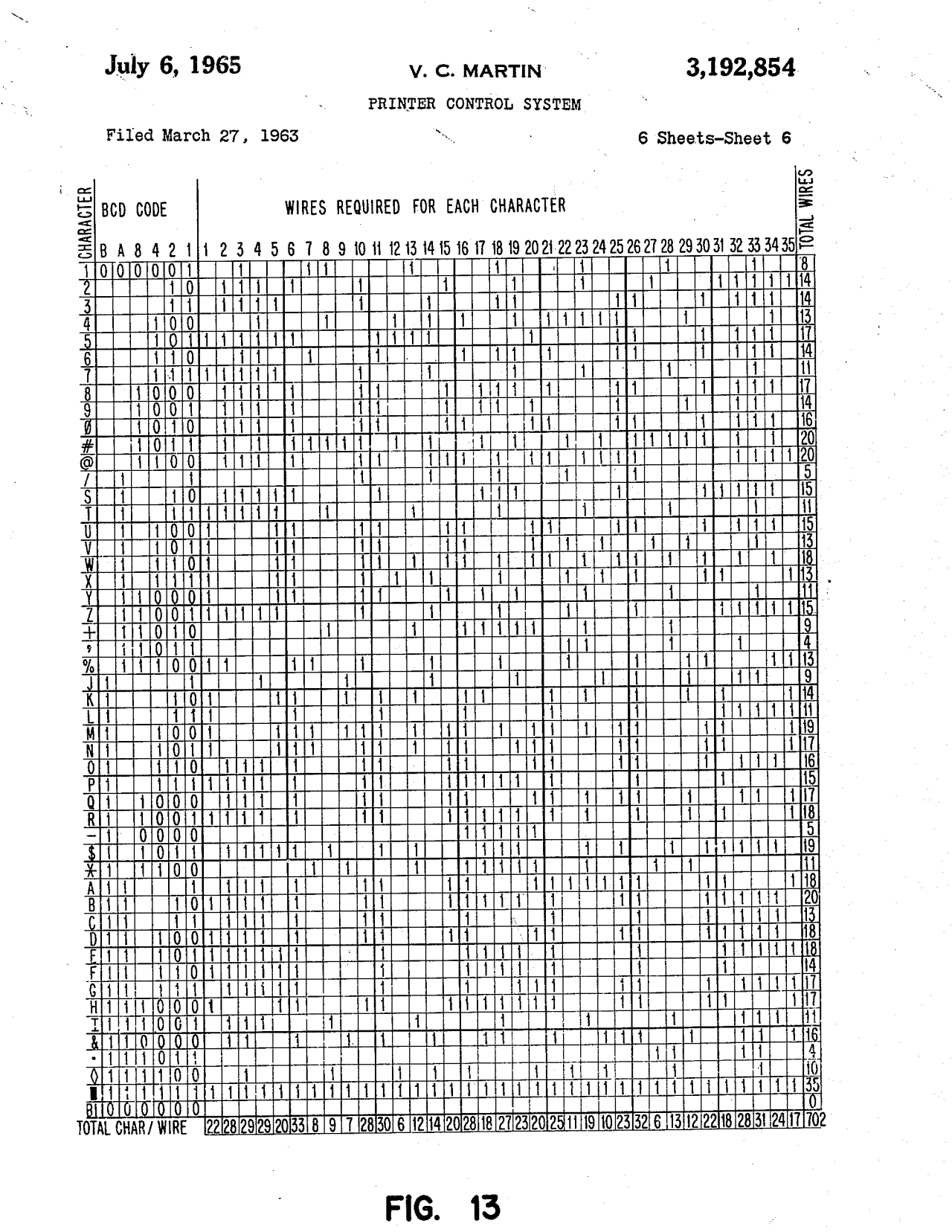

Referring particularly to the drawings, the reference numeral 10 denotes generally a print control system for a printer such as of the helix and bar type wherein information to be printed is first read or loaded into buffer core storage 12 by being read in over data input line 14 in conjunction with a READIN signal at terminal 16 to a single character register 18 and then into storage 12 over line 20 through inhibit drivers 22. READIN is accomplished by reading the information into the buffer storage 12 over the input line 14 in, for example, the binary coded decimal code, such as shown in the table of FIG. 13 through the use of the usual address rings 24 and 26 which comprise units and tens address rings operating under the control of a clock 28 in conjunction with clock controls 29. The rings provide through AND circuit 27 a last buffer address signal for controlling the clock. The rings 24 and 26 also address a helix print bar drive matrix 30 over lines 31 and 32, respectively. Validity check means 21 of the usual type may be associated with the line 20 for checking the validity of the data transmitted thereover.

In order to provide for controlling the operation of helix print bar drive 30, characters in the buffer storage 12 are serially read out into the character register 18 through sense amplifiers 17 in response to a print signal and dot timing pulses. A binary coded decimal to dot decode or converter matrix 36 is provided which converts or decodes the character in the register 18 from the binary coded decimal code to a dot matrix code also shown in FIG. 13. For this purpose a dot timing emitter or drum 40 is provided which is driven in synchronism with the helix of the printer for providing a plurality of timed pulses which are used in conjunction with start pulses from a start timing emitter or drum 42 to control dot timing controls 44 which in turn advance a dot time generator 46 to provide timed pulses for operating the clock 28 to address the buffer register 12 each dot time, read the characters one by one into the character register 18 where the converter 36 decodes them into for example the dots of a five by seven dot matrix to determine which print bar drivers of the matrix 30 must be energized each dot time to provide a dot for the particular character in the character register 18.

Figure 2:
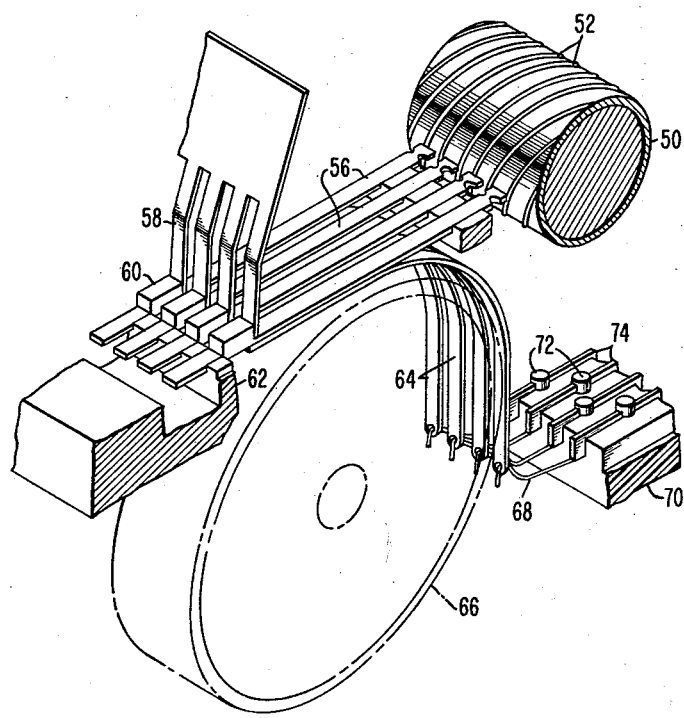
FIG. 2 is a diagrammatic isometric view of a portion of a helix and bar type print mechanism such as is used in connection with the control system of FIG. 1.

Referring to FIG. 2 it will be seen that the helix of the helix and bar printer comprises a printing cylinder 50 having a plurality of helical print surfaces 52 thereon. In the present instance, ten helices are used, which may be obtained for example by winding high strength steel wire in grooves cut in the surface of the cylinder or they may be formed thereon as threads of a screw or the like so that adjacent turns are spaced a character apart. Cooperating with the helices 52 are a plurality of print bars or anvils 56 each of approximately one character width, one for each print position, and which are movable longitudinally toward and away from the cylinder 50 so as to define with portions of helices as they pass different dot positions. The print bars 56 may be biased away from cylinder 50 by means of springs 58 which may comprise a plurality of projections from a common strip of suitable spring material formed in a comb-like fashion. The springs 58 are prestressed so that their lower ends engage one vertical face of projections 60 on the print bars 56, the opposite face of these projections engaging a stationary cap bar or stop 62, thus defining the normal or nonprinting position of the print bars 56. It will be noticed that the striking ends of the print bars 56, that is the ends which are nearest the printing cylinder, are slightly twisted or skewed a small amount with respect to the axis of the printing cylinder having the right edge slightly raised. This skew compensates for the upward motion of the paper or record medium during printing. Since the record medium on which printing is to be accomplished is in constant motion, being as shown in FIG. 3 driven by sprocket drive means 61, the line of the print bars must also be skewed upward toward the right in the direction of the paper motion by an amount equal to the distance the paper moves during one dot time.

Figure 3:
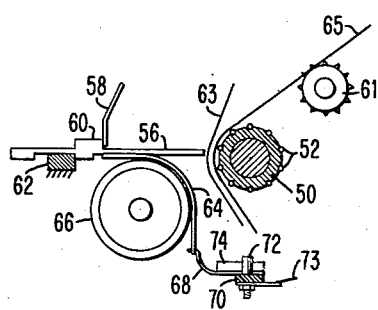
FIG. 3 is an end elevational view of the mechanism shown in FIG. 2 but reduced in size showing further details as regards the helix and print record medium.

Referring to FIGURES 2 and 3 collectively, it will be seen that the print bars 56 are actuated to drive a carbon paper 63 and a print record medium 65 against a helix to print a dot, by means of clutch bands 64 which may be attached at one end to the printing bar as by a layer of insulating cement, so that they are enabled to transmit the driving force to the printing bar but are electrically insulated therefrom. The bands 64 are shown as having substantially 90 degrees of wrap-around the clutch rotor 66 which is driven in a suitable manner. The other ends of the bands 64 have small holes or openings to receive the hooked ends of springs 68 which are anchored in any suitable manner to a support bar 70 of insulating material, such as by threaded studs 72 and clamping pieces 74 which not only serve to hold the springs in place but also provide a means for making separate electrical connections by means such as conductor 73 to each of the springs 68 and hence the clutch bands 35. This arrangement of helix print bars and driving means is substantially the same as shown in Patent No. 2,909,996 which issued on October 27, 1959, to C. J. Fitch and is assigned to the assignee of the present invention.

Figure 4:
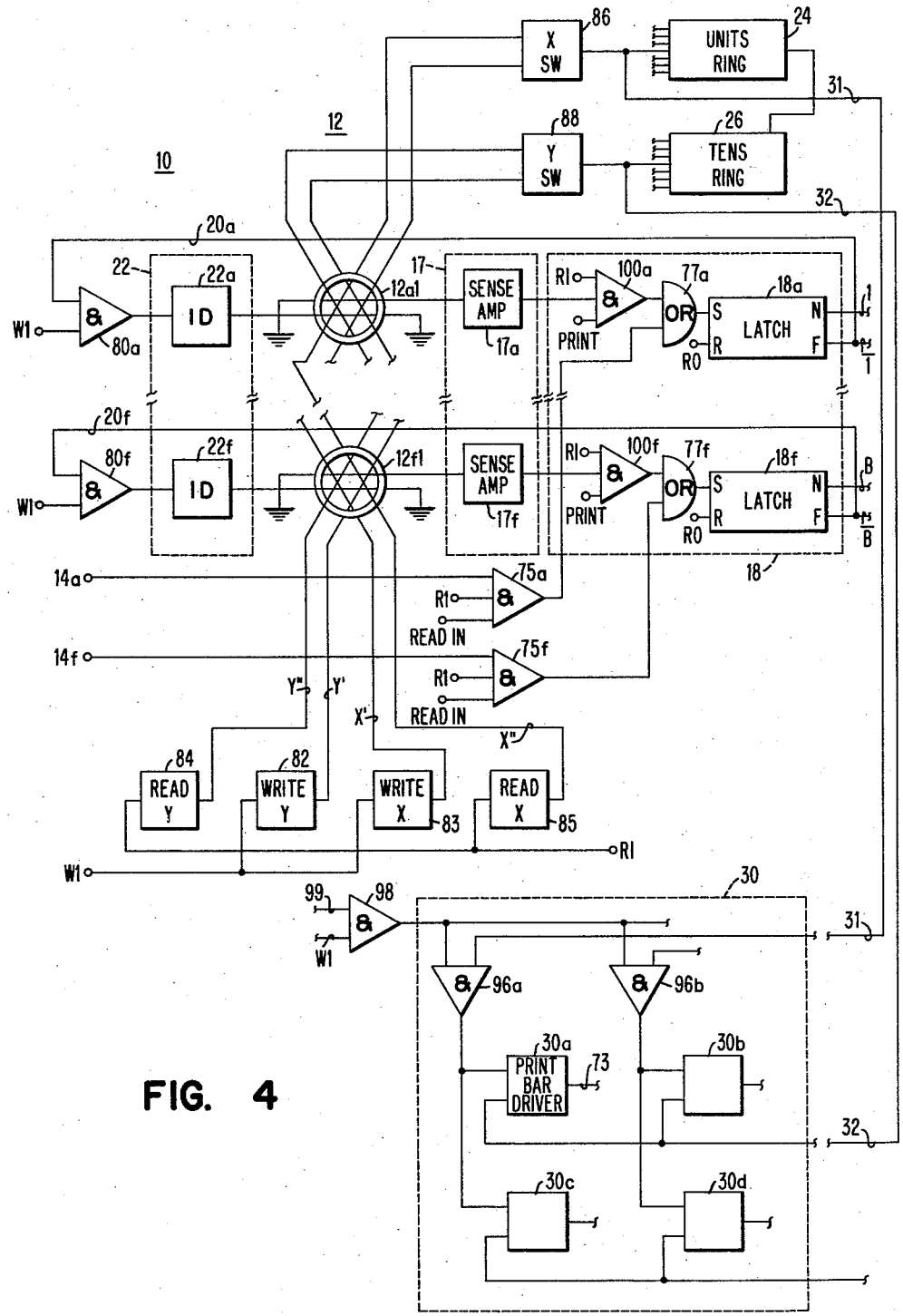
FIG. 4 is a partial schematic diagram of portions of the buffer storage and print bar drive matrix of FIG. 1.

Referring to FIG. 4, it will be seen that the buffer core storage 12 may comprise a plurality of planes of core storage matrices, the cores 12a1 and 12f1 representing for example cores in the number 1 position for example in the top and bottom planes of the storage, respectively. Information is entered or loaded into the buffer storage 12 over data input lines represented by the lines 14a and 14f through AND circuits 75a and 75f, in conjunction with READIN signals and a clock signal R1 from clock 28 as will be explained hereinafter, through OR circuits 77a and 77f, respectively, to set latches in the character register 18, namely latches 18a and 18f. Latch 18a represents the 1 bit of the input data while the latch 18f represents the B bit of the input data, the binary coded decimal code comprising 1, 2, 4, 8, A and B bits as shown in the table of FIG. 13.

Inhibit drivers 22a and 22f are controlled over lines 20a and 20f through AND circuits 80a and 80f in conjunction with the clock timing pulses W1 for controlling the writing or loading of information into the cores 12a1 and 12f1 through inhibiting or not inhibiting the coincident pulse action of write lines Y' and X', which are controlled by means of write drivers 82 and 83, respectively. Addressing of the different cores in the planes is controlled by means of X switches and Y switches 86 and 88 under the control of the units ring 24 and the tens ring 26 in a well-known manner.

The outputs from the units ring 24 and tens ring 26 are also supplied over lines such as the lines 31 and 32 where they are used to control the firing of the print bar drivers such as drivers 30a through 30d, which are representative of the plurality of drivers required for the print bars of a complete print line. The output from the units ring 24 over line 31 may be ANDed in AND circuits such as circuits 96a and 96b with the output from an AND circuit 98, the input of which includes the clock signal W1 from the timing clock and a print bar activating signal over line 99 from the binary coded to dot converter 36. The driver 30a when gated provides an output over a line such as 73 to activate clutch band 64 to operate its associated print bar 56 (FIG. 3).

In order to provide for controlling the print bar drivers 30a through 30d, readout of the buffer core storage 12 may be effected serially character by character under the control of rings 24 and 26 by the application of a Print Signal to AND circuit 100a through 100f in conjunction with R1 clock timing signal and the output from the sense amplifiers 17a through 17f in response to coincident READ signals at R1 time from the Y and X READ switches 84 and 85 over lines Y" and X".

Figure 5:
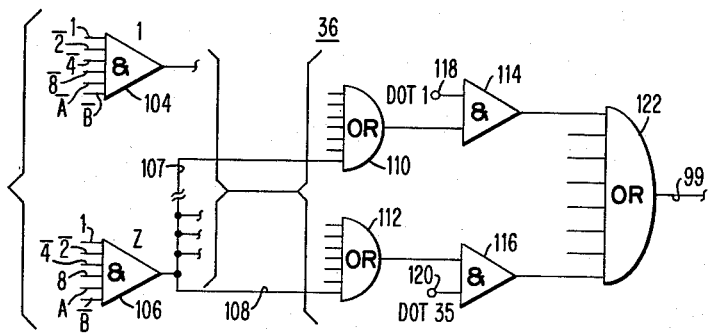
FIG. 5 is a schematic illustration in part of one arrangement for the decode matrix of FIG. 1.

Referring to FIG. 5, the reference numeral 36 designates generally logic circuit details of the binary coded decimal to dot decode or converter circuit of FIG. 1. As shown, the converter comprises for an input a plurality of AND circuits having inputs individually representing in binary coded decimal the different characters 1 to 10 and A through Z of which only two are shown as representative. For example, AND circuit 104 representing the numeral 1 has for its inputs from the character register 18, the ON or 1 output of the 1 latch 18a and the OFF or NOT outputs $\bar{2}$, $\bar{4}$, $\bar{6}$, $\bar{8}$, $\bar{A}$ and $\bar{B}$ of the 2, 4, 6, 8, A, B latches of the character register 18. The AND circuit 106 representing the character Z will have the ON output of the 1, 8 and A latches together with the OFF or NOT outputs $\bar{2}$, $\bar{4}$ and $\bar{B}$ of the 2, 4 and B latches. Since the character Z has a 1 dot as well as a 35 dot in its dot registration, as shown in FIG. 13, lines 107 and 108 from the Z AND circuit 106 go to OR circuits 110 and 112, the outputs of which are gated in AND circuits 114 and 116, respectively, with the dot 1 time signal at terminal 118 and the dot 35 time signal from dot time generator 46 at terminal 120, respectively. There are 35 such AND circuits, and their outputs are ORed in a common OR circuit 122 to provide an output over line 99 which indicates that a print bar should be activated to print a dot at the particular dot time.

Figure 6:
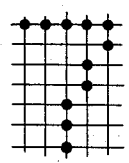
FIG. 6 is a diagrammatic representation of the manner in which a character such as the numeral 7 is printed by dots in a 7 by 5 matrix by the subject printing mechanism.

Referrings to FIGS. 6 and 13 it will be seen that characters are represented by different combinations of dots in a dot matrix, and as an example, the character 7 may be represented by dots in positions 1 through 5, 10, 14, 19, 23, 28 and 33 of the 35 dots, in for example, a five by seven dot matrix. It will be realized that this arrangement is merely typical, and other arrangements may be used if desired. The numbers of dots required for each of the characters of the alphabet together with the numeric and special characters may vary from 4 dots for a period, to twenty dots for a B and thirty-five dots for a complete matrix or pillow, and is shown in the chart of FIG. 13 together with the binary coded decimal input code for each of the characters which may be used.

Figure 7:
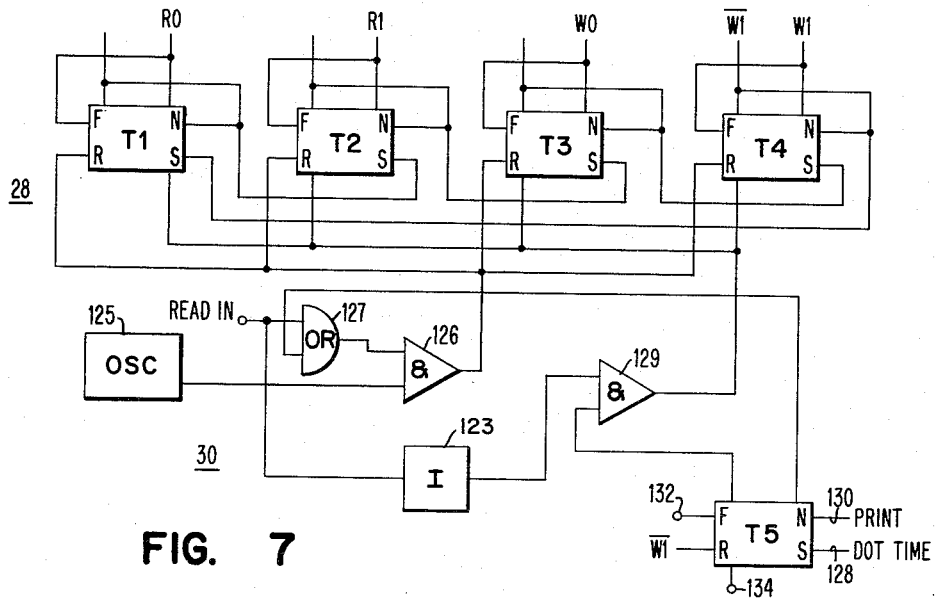
FIG. 7 is a schematic illustration of one form of the clock and clock control system which may be used in the system of FIG. 1.
Figure 8:
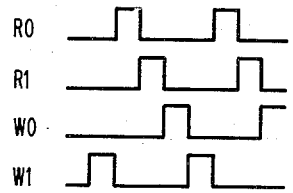
FIG. 8 illustrates timing curves such as produced by the clock arrangement of FIG. 6.

Referring to FIG. 7 it will be seen that the clock 28 may be of conventional design employing a four-stage trigger ring with the triggers T1 through T4 connected to give successive clock pulses R0, R1, W0 and W1 in sequence under the control of the clock controls 30 comprising an oscillator 125 which runs continuously and gates in an AND circuit 126 with the output of a control trigger T5 to advance the clock ring. The clock 28 is advanced during loading by a READIN signal applied through OR circuit 127. An inverter 128 provides an input to AND 129 to take the reset signal from T5 off during READIN. The trigger T5 is controlled by pulses over input line 128 from the dot timing controls 44 which gate with the print signal which is applied at terminal 130. Reset of the ring is effected at the end of each memory scan by a last buffer address signal from the address rings 24 and 26 through AND circuit 27 as the last address is scanned over input line 132 and the OFF or $\overline{W1}$ signal from the trigger T4. Reset of the clock may also be effected by means of a machine reset signal applied at the terminal 134. The curves of FIG. 8 illustrate the timing arrangement of the pulses R0, R1, W0 and W1 from the clock.

Figure 9:
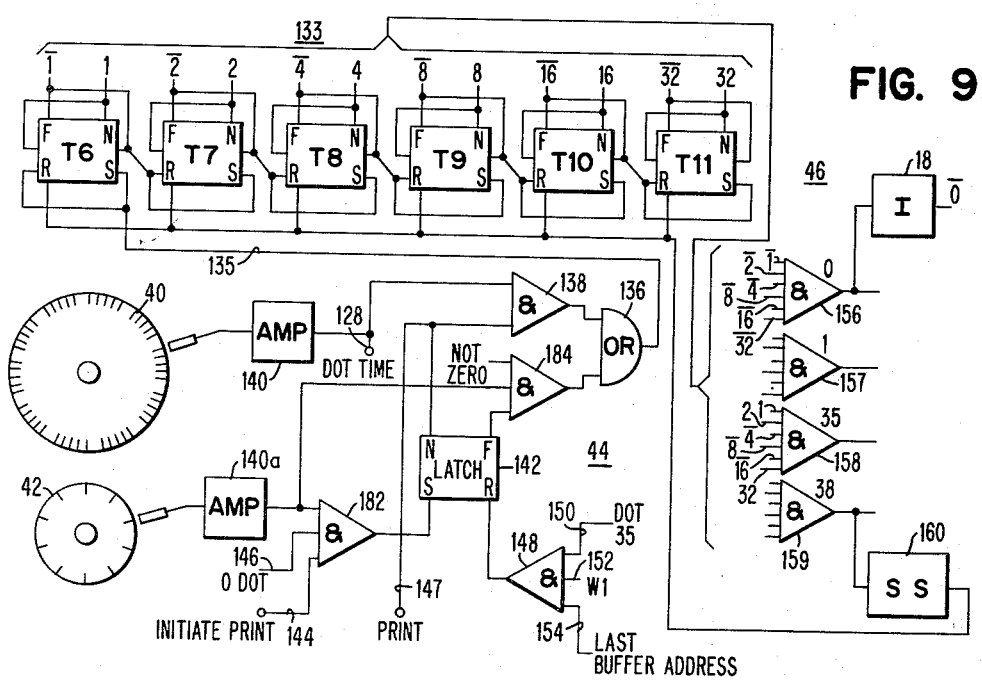
FIG. 9 is a schematic illustration of one form of circuit arrangement used for generating the dot timing pulses in the system of FIG. 1.

Referring to FIG. 9 it will be seen that the dot time generator 46 may comprise a conventional binary counter 133 comprising triggers T6 through T11 arranged to provide a 1, 2, 4, 8, 16 and 32 count. The counter ring 133 is advanced by pulses over line 135 from an OR circuit 136 of the dot timing controls 44. One input to the OR circuit 136 is derived from AND circuit 138, one input of AND 138 coming from the dot timing drum or emitter 40 which may be of a well-known magnetic type and is provided with a plurality of groups of five slots each spaced by a blank slot interval so as to provide ten spaced groups of five pulses or fifty pulses per revolution through an amplifier 140 to the AND circuit 138 in timed relation with the movement of the helices 52 past the print bars 56 for scanning of the dot positions, the dot timing drum 40 being driven in synchronism with the helix cylinder 50. The other input to the AND circuit 138 is derived from a print timing latch 142 which is gated ON by a start timing pulse from the start timing drum or emitter 42, also driven in synchronism with the helix 50 and timing drum 40, and which is provided with ten slots coinciding with the starting times of the ten groups of pulses from the timing drum 40 and the helices 52 on the cylinder 50. The pulse from the start start timing drum 42 is applied to amplifier 140a and is gated with the Initiate Print signal at terminal 144 and a 0 dot signal at terminal 146 to turn on latch 142 and produce a Print signal at terminal 147. Reset of the latch 142 is effected by means of an AND circuit 148 having an input on the terminal 150 from dot 35 time, an input at terminal 152 from the W1 clock time, and an input on terminal 154 from the last buffer address line 132, at the end of the addressing of the storage 12.

The different dot time signals are derived from the generator 46 through a plurality of AND circuits in which outputs from the counter 133 are gated to provide dot times designated 0 through 38. AND circuits 156 through 159 which represent the 0, 1, 35 and 38 dot times are shown as representative. These AND circuits have input lines energized from the ON and OFF output lines of the dot timing generator triggers T6 through T11 as designated, and are in accordance with the designations set forth in the chart of FIG. 13. It will be noted that in the dot time generator controls, printing ceases at the end of the dot 35 time. In order to allow three dot row spaces between lines, the OFF output of the print latch 142 is used to advance the dot time generator 46 at each start drum 42 pulse time after dot 35 time and until dot 38 time is reached. At this time a reset single shot 160 fires, resetting the counter to 0 so that the next line of printing can start.

Figure 10:
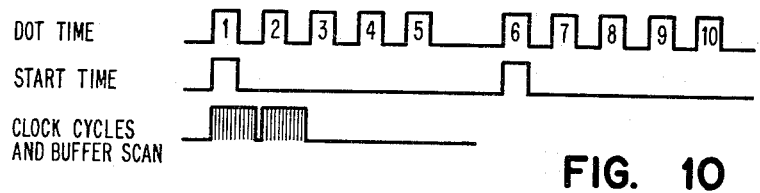
FIG. 10 shows curves illustrating the timing relations of the dot timing pulses, start pulses, and clock pulses.

The curves of FIG. 10 illustrate the dot and start timing outputs relative to the clock cycles. The dot timing drum output pulses are illustrated in the first row while in the second row are shown the start timing drum pulses which coincide with the first of the group of dot time pulses. In the lower row, a relative showing of the clock cycles and the buffer scan is made, it being realized that a complete scan of all buffer address positions is made for each dot time pulse.

As an example of a typical arrangement for 100 characters per line, an 800 kc. oscillator could be used and with four clock points, R0, R1, W0, W1 per clock cycle, a clock cycle of five microseconds could be obtained. A memory scan would run 500 microseconds so that a dot time on the order of 550 microseconds would be possible. This gives a line time of approximately 33 milliseconds since with a 5 x 7 dot matrix character spacing requires a dot matrix of 6 x 10 with one dot time between characters and three dot times between lines. Line pitch would be .0167 x 10 in. or .167 inch. The paper speed would be approximately $$\frac{.167}{.033}$$

inches/sec. or approximately 5 in. per sec. and the line rate would be $$\frac{60}{.033}$$

or 1,815 lines/min.

The character width is approximately .083 inch and a typical spacing is 1/10 inch between centers. With ten helices on the print cylinder the pitch may be such that a particular helix sweeps the end of a particular print bar in 1/10 of a revolution.

Figure 11:
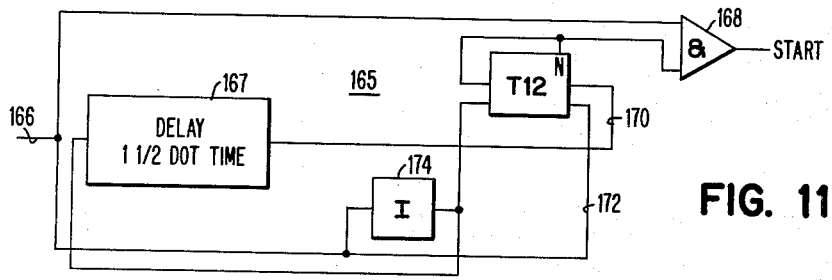
FIG. 11 is a schematic illustration of circuitry for sensing the start time without the need of a start timing drum which may be used in the circuit of FIG. 1.
Figure 12:
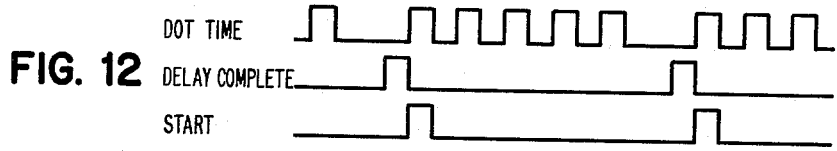
FIG. 12 shows timing curves illustrating the application of the circuitry of FIG. 10 to the system of FIG. 1

Referring to FIG. 11, the numeral 165 designates generally an alternate arrangement for obtaining start pulses without the use of the start drum 42. Pulses from the dot timing drum 40 are applied over input line 166 and inverter 174 to a delay circuit 167 having a delay of 1½ dot times. The input line 166 is also connected to a start time AND circuit 168 to gate with the ON signal of a start trigger T12. The trigger T12 is gated by the delay signal being applied over conductor 170 along with the dot time signal over conductor 172. Reset is effected by connecting the input line 166 through inverter 174 to gate with the ON signal of T12. Now when the dot time signal is down for a time equivalent to 1½ normal down time this gates T12 so that the next dot time sets T12 as shown by the curves of FIG. 12. The normal down time between dot times is too short to complete the delay, so that T12 is not gated on the next pulse.

Referring to FIGS. 1 and 4, it will be seen that the buffer core storage 12 is loaded by applying binary coded decimal input signals to the input lines 14 of the character register 18 together with a READIN signal which is also used to start the clock and which gates with the clock pulse R1 to set the respective character register latch 18a through 18f through AND circuits 100a and 100f and 18f, OR circuits 77a through 77f, the latches 18a and 18f having been reset at R0 time. At W1 clock time the WRITE Y and WRITE X drivers 82 and 83 are energized and set the respective cores 12a1 through 12f1 over lines Y′ and X′ provided their inhibit drivers 22a through 22f are not set. This is determined by the condition of the corresponding latches 18a through 18f. If for example the latch 18f is set, the B line will be up and the $\overline{B}$ or OFF B line will be down. This being the case, the inhibit driver 22f will not be turned on at W1 time as line 20f is down. Accordingly, the inhibit driver 22f is ineffective to oppose setting of the core 12f1 when the WRITE Y and WRITE X drivers 82 and 83 are activated. All of the print line position cores in the different planes are addressed serially under the control of the rings 24 and 26 in a well-known manner to complete storage of a complete print line of characters in the buffer storage 12. Rings 24 and 26 are advanced at R0 time.

At the Print time the application of an Initiate Print signal to the dot timing controls 44 at the terminal 144 gates with the 0 dot signal which is obtained through 0 dot timing and the circuit 156 along with a start signal from the start timing drum 42 to gate AND circuit 182 and turn on the start or Print latch 142. The output from latch 142 gates in AND circuit 138 with the dot timing pulses from the amplifier 140, and through OR circuit 136 advances the dot timing generator 46. Accordingly, dot timing pulses are produced at the AND circuits 156 through 159 in accordance with the particular dot times. The clock is advanced by the application of a Print signal from latch 142 to terminal 130 of the trigger T5, along with the dot time signal from amplifier 140 at terminal 128. The clock therefore operates to address the buffer core storage 12 and read out the characters in storage through the sense amplifiers 17a–17f, AND circuits 100a–100f, and OR circuits 77a–77f into the character register 18 latches 18a–18f one character at a time until all characters have been addressed at each dot time. The output of the character register 18 is applied to the binary coded decimal to dot converter 36 which indicate at each dot time whether the particular dot is necessary for each character as the buffer core storage is addressed. The output from the converter 36 is applied to OR circuit 122 through AND circuits represented by the dot 1 and dot 35, AND circuits 114 and 116, respectively, so as to sample the different print bar drivers 30 through 34, etc. for activating the respective print bars 56 to print a dot for each character requiring the dot corresponding to the particular dot timing. When the dot time generator reaches dot time 35 every position will have been scanned for all printable dot positions. The extra dot times 36, 37 and 38 permit the advance of the record medium during three start time pulses so as to position the record medium for the next print line. At dot time 38, the single shot 160 resets the dot time generator 46 so its is ready for a subsequent print line operation.

From th foregoing it is generally seen that the printing control system constructed in accordance with this invention is capable of operating at a relatively high printing speed with relatively close columnar spacing with small, light-weight movable printing anvils or bars provided for each position. By utilizing the buffer core storage code converter and the dot timing generator arrangement of the invention, the switching controls are greatly simplified.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The combination with a helix and bar print mechanism having a rotating cylinder with a plurality of raised helical print surfaces and a plurality of movable print anvils actuable toward and away from the cylinder along a substantially horizontal line to print on a record medium moving at a constant vertical speed therebetween of
    (a) buffer storage means for storing representations of a line of characters according to one code,
    (b) a character register connected to the buffer storage means for receiving the coded representation for one character at a time from the buffer storage,
    (c) code conversion means having output lines for each dot position of a dot matrix for converting the representation of each character in the register from said one code to outputs on particular ones of the dot lines defining the character,
    (d) dot timing means including a counter advanced in timed relation with movement of the helices to produce dot pulses as the helices pass each dot position of the character dot matrix,
    (e) circuit means ANDing the outputs of the dot timing means and the conversion means to produce an output for each dot required for the character at the corresponding dot time,
    (f) operating means individual to the print anvils for moving them toward the cylinder, and
    (g) circuit means for serially scanning the buffer storage and the anvil operating means each dot time and operable jointly with said ANDing circuit means to effect serial operation of said operating means selectively.

2. The combination with a helix and bar print mechanism having a continuously rotating cylinder with a plurality of helices thereon cooperative with a line of print bars movable toward and away from the cylinder at a print line to print character defining dots on a record medium disposed between the bars and cylinder to move transversely of said line, of
    (a) buffer storage means for storing representations according to one code of a plurality of characters to be printed along said line,
    (b) a single character register connected to the buffer storage means disposed to receive said representations one character at a time from said buffer storage,
    (c) a converter for converting the representation of a character in the register to a dot representation comprising select dots of a dot matrix defining the character,
    (d) a dot generator including timing means connected in driven relation with the cylinder to produce dot timing pulses each time a helix passes a dot position at the print line,
    (e) operating means for each of the print bars,
    (f) means for serially addressing the positions of the buffer storage and said print bar operating means,
    (g) means connecting the dot timing means and the addressing means to address the buffer storage each dot time, and
    (h) means connecting the dot timing means and the converting means to effect selective operation of the print bars to print no more than one dot at a time for each character at each dot time.

3. The combination with a helix and bar print mechanism having a rotatable cylinder with a plurality of helical print surfaces thereon cooperative with a plurality of print bars arranged one at each of a plurality of print positions along a print line for movement toward and away from the cylinder to print dots at different dot positions at each print position on a record medium interposed to move at a constant rate between the cylinder and print bars of
    (a) a buffer core storage for storing according to one code representations of each of a plurality of characters comprising one print line,
    (b) a single character register connected to the buffer core storage for receiving one character representation at a time from the buffer storage as said buffer storage is addressed,
    (c) a decode means for decoding a character representation in the register into an output dot code comprising predetermined ones of a dot matrix defining the character,
    (d) print bar operating means individual to each of the print bars,
    (e) dot generating means for producing dot timing pulses each time a helix passes a dot position,
    (f) means for addressing serially the buffer storage and the print bar operating means,
    (g) circuit means connecting the dot generator means to scan the decode output dot by dot to determine the dots defining the character in the register,
    (h) circuit means to print no more than one dot for each character connecting the dot generating means to the addressing means for addressing the buffer storage and print bar operating means serially each dot time and
    (i) additional circuit means connecting the addressing means and the dot generating means to control the advance of the dot generator.

4. In combination with a helix and bar print mechanism having a rotatable cylinder with a plurality of helices thereon and a plurality of print bars individual to corresponding print positions with operating means for moving them toward and away from the cylinder to print on a record medium disposed between the cylinder and bars,
    (a) dot timing means including a dot timing drum driven with said cylinder to produce groups of dot timing pulses in timed relation with passage of the helices past said bars,
    (b) a dot generator ring,
    (c) means for producing a start pulse in timed relation with said groups of timing pulses,
    (d) circuit means connecting the start pulse means and the dot timing means to advance the dot generator ring,
    (e) print buffer storage means for storing according to one code representations of characters to be printed at each print position,
    (f) means including a single character register and decode means connected to the buffer storage means for converting each said coded representation into a dot representation one character at a time,
    (g) circuit means connecting the dot timing means and storage means to serially scan the character representations in storage for each dot time,
    (h) additional circuit means connecting the dot generator ring and the decode means to produce an output each dot time that a dot is required for the particular character and
    (i) means responsive to said output for energizing the operating means of the corresponding print bar.

References Cited by the Examiner
UNITED STATES PATENTS

| | | | |
|---|---|---|---|
| 2,869,455 | 1/59 | Knutsen | 101—93 |
| 2,909,996 | 10/59 | Fitch | 101—93 |
| 2,969,730 | 1/61 | Brehm | 101—93 |
| 3,087,420 | 4/63 | Brehm | 101—93 |

WILLIAM B. PENN, *Primary Examiner.*